United States Patent [19]

Constable

[11] 4,262,303
[45] Apr. 14, 1981

[54] CORRECT TINT INDICATOR CIRCUIT FOR A VIR SYSTEM

[75] Inventor: Douglas W. Constable, Batavia, N.Y.

[73] Assignee: GTE Products Corporation, Stamford, Conn.

[21] Appl. No.: 76,017

[22] Filed: Sep. 17, 1979

[51] Int. Cl.³ .......................................... H04N 9/535
[52] U.S. Cl. ..................................................... 358/28
[58] Field of Search ........................... 358/28, 21 V, 10

[56] References Cited

U.S. PATENT DOCUMENTS 4,091,411  5/1978  Sanada et al. .......................... 358/28

*Primary Examiner*—Richard Murray
*Attorney, Agent, or Firm*—John A. Odozynski

[57] ABSTRACT

In a VIR-responsive television receiver that also includes a manually-operated tint preference control, a circuit for indicating correct setting of that control. A comparator detects approximate equality between the VIR tint control voltage and the tint preference voltage. An LED, driven by the comparator, indicates the existence of this condition.

4 Claims, 1 Drawing Figure

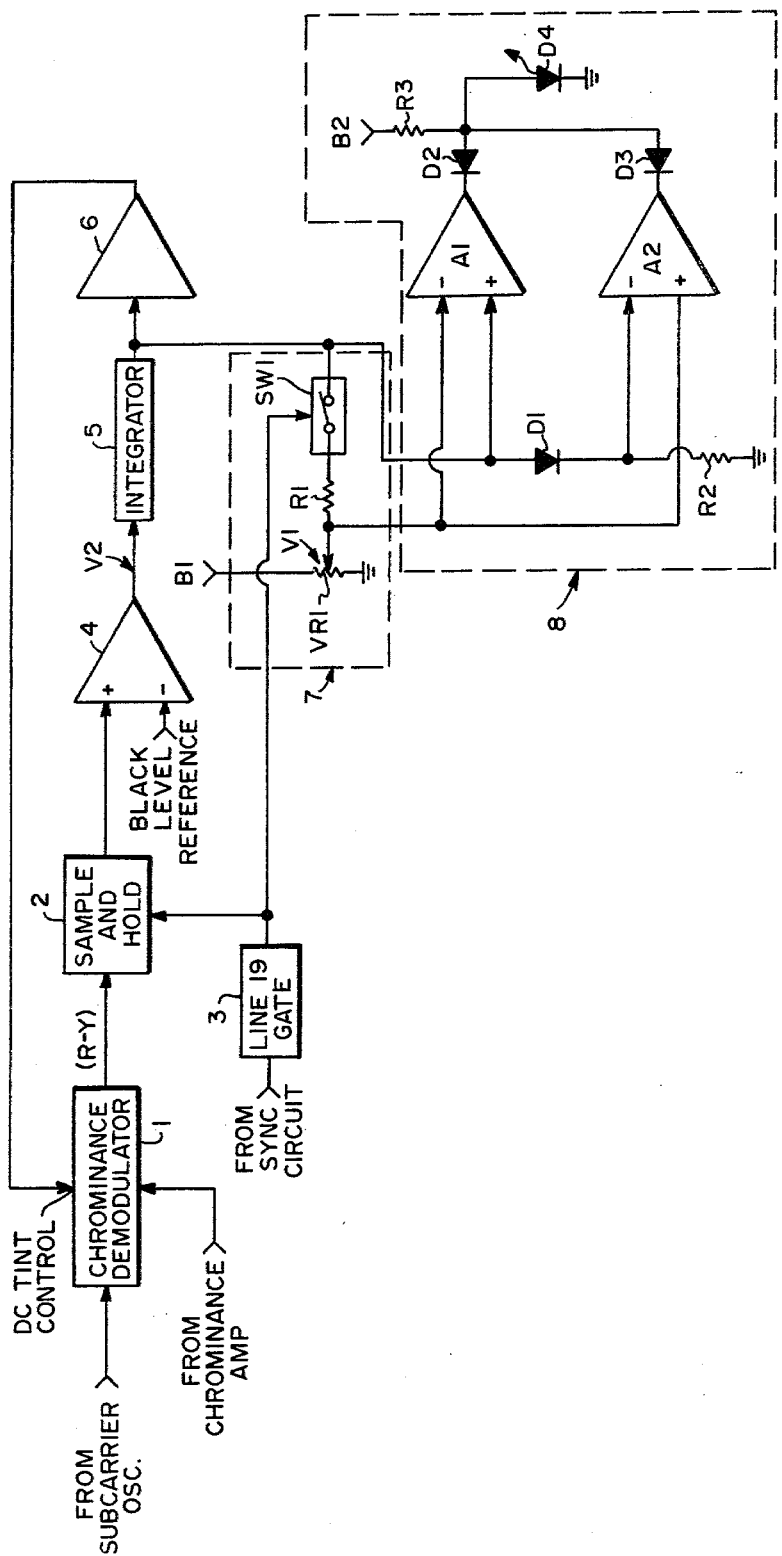

CORRECT TINT INDICATOR CIRCUIT FOR A VIR SYSTEM

TECHNICAL FIELD

This invention relates to VIR (Vertical Interval Reference) control of broadcast equipment or television receiver chrominance signals and more particularly to a circuit for indicating the correct setting of a viewer-operated tint preference control.

BACKGROUND ART

Those skilled in the design of color television receivers are aware that the VIR signal affords an effective means of automatically adjusting both the tint and saturation of the color signal and therefore correcting errors that may occur in both the transmission and processing of the chrominance signal. Articles appearing in the August and September 1976 issues of Electronic Technician Dealer, beginning on page 14 and page 20 respectively, describe both the composition of the VIR signal and circuitry for implementing automatic control of the color signal. With particular relevance to this invention, there appears on pages 26-27 of the September issue a description of a tint preference control that provides the viewer limited adjustment of the receiver's tint during automatic operation. Tint preference, as described therein, is achieved by adding a small DC voltage, via a viewer-operated potentiometer, to the DC tint control voltage developed by the VIR circuitry. This invention is directed to a circuit for detecting and indicating that the tint preference control has been correctly adjusted.

DISCLOSURE OF THE INVENTION

The invention is an improvement in VIR-responsive television receivers that also include viewer-operated circuitry for providing a tint preference voltage as an offset to the VIR tint control voltage. The improvement comprises comparing means for detecting a specific relationship, for example approximate equality, between the VIR tint control voltage and the tint preference voltage. Indicating means coupled to the output of the comparing means supplies the viewer a sensory indication of the existence of this relationship.

The invention allows correct adjustment of the tint preference control in situations where minimal offset between the VIR tint preference control and VIR tint control voltage are desired.

BRIEF DESCRIPTION OF THE DRAWING

The sole drawing is a schematic diagram of the invention. Conventional co-operating elements are depicted as labeled rectangles.

BEST MODE FOR CARRYING OUT THE INVENTION

For a better understanding of the present invention, together with other and further objects, advantages and capabilities thereof, reference is made to the following disclosure and appended claims in connection with the above-described drawing.

Refer now to the drawing in which the essential elements of a rudimentary VIR Tint Control system are depicted. The output of the 3.58 MHz chrominance subcarrier oscillator (not shown) is coupled to one input of chrominance demodulator. The chrominance information bearing signal is coupled from the output of a chrominance amplifier (also not shown) to the other input of the demodulator. In a manner that is well known, the amplitudes and relative phases of the oscillator and chrominance signals determine the saturation and tint of the demodulated chrominance signal that is applied to the CRT. In particular, the oscillator phase can be adjusted by either manual or automatic application of a DC voltage to the demodulator's DC Tint Control terminal. In any event, the Tint Control voltage establishes the hue (tint) characteristics of the image reproduced on the CRT screen. The VIR tint control system is an example of one manner in which automatic tint control can be effected. It operates, basically, as follows.

The (R-Y) output of the demodulator is coupled to the input of a Sample and Hold (S/H) circuit 2. The S/H circuit operates in response to the output of a Line 19 gate 3. In short, the gate counts the horizontal synchronizing pulses and generates an appropriate logic signal, thereby enabling the S/H circuit, during the 19th line of each frame, that is, during the occurrence of the VIR signal. The output of the S/H circuit is coupled to one input of a comparator 4 having another input coupled to Black Level Reference voltage. This voltage is one component of the VIR signal and, although its exact characteristics and manner of synthesis are not prerequisite for an understanding of the invention, suffice to say that it corresponds to a voltage representing total absence of chrominance information in the VIR signal. The VIR signal is so constructed that, if the chrominance subcarrier is properly phased (that is, tint control properly adjusted), the (R-Y) output of the demodulator will be equal to the Black Level Reference during the first 20 microseconds of the VIR signal.

A difference between the (R-Y) demodulator output and the Black Level Reference signals is detected by the comparator. The comparator output is integrated by an integrator 5, amplified by a DC amplifier 6 and, according to standard feedback techniques, applied to the DC Tint Control terminal of the demodulator in a fashion that tends to reduce the difference to zero.

The foregoing referred to a VIR Tint Control system in probably its most basic form. However, it has also been found useful to make available a viewer-operated manner of adjusting the DC Tint Control voltage. This can be simply achieved by virtue of the Tint Preference Control circuit 7, shown in the drawing. Circuit 7 includes a variable resistor, VR1, coupled between a voltage supply, B1, and ground. The wiper of VR1 is coupled through a resistor R1 and a switch SW1 to the input of amplifier 6. SW1 may be one of a number of electronic, or possibly mechanical, forms but it is important to note that its operation is such that it is open during the VIR interval and otherwise closed. This is accomplished by coupling its control terminal to the output of gate 3 as shown. Because SW1 is open during the VIR interval, a VIR Tint Control voltage will be developed at the output of comparator 4 as described above. However, during all other times, the closure of SW1 will introduce an offset into the DC Tint Control. The magnitude and direction of this offset will vary with the degree and direction of the positioning of the wiper of VR1, thereby affording the viewer a means for adjusting tint control, independently of the VIR system.

However, it is clear that given a reliable VIR tint control system, there may be good reason to assure that no offset be introduced into the DC Tint Control voltage. This is achieved by a correct tint indicator circuit 8. Circuit 8 includes a first amplifier, A1, having an inverting input coupled to the wiper of VR1 and a non-inverting input coupled to the output of integrator 5. A second amplifier, A2, has a non-inverting input coupled to the wiper of VR1 and an inverting input coupled through a diode D1 to the non-inverting input of A1 and through a resistor, R2, to ground. The outputs of A1 and A2 are respectively coupled through diodes D2 and D3 to the first end of a resistor, R3, having a second end and coupled to a voltage supply, B2. An indicating device in the form of an LED, D4, is coupled between the first end of R3 and ground.

Operation of the correct tint indicator is as follows. Assuming that A1 and A2 approach ideal performance as either operational amplifiers or comparators, it can be assumed that these outputs are conducting whenever the voltage at the inverting input is greater than the voltage at the non-inverting input and that, conversely, nonconducting whenever the voltage at an inverting input is less than the voltage at a non-inverting input. Whenever either A1 or A2 is conducting the voltage at the anode of D4 will approach ground potential, negligible current will flow through it, and no light will be emitted. On the other hand when both A1 and A2 are nonconducting, current will flow through the LED rather than into A1 or A2 and the LED will emit light. It can be seen that A1 will be nonconducting whenever the tint preference voltage, V1 in the drawing, is less than the VIR tint control voltage, V2 in the drawing. Because of the voltage drop across D1, developed by current flow through it and R2 to ground, A2 will be nonconducting whenever the tint preference voltage is greater than the VIR tint control voltage minus one diode drop. Designating the voltage drop across D1 as $V_x$, it can be seen that the LED will emit light, thereby giving the viewer a visual indication that VR1 has been set at a voltage approximately equal to the VIR tint control voltage whenever $V_2-V_x \leq V_1 \leq V_2$.

Although a specific embodiment of this invention has been described above, it is clear that it would be obvious to make alterations and modifications in the comparator circuit as desired. For example, different limits on the prescribed degree of equality between V1 and V2 can be established by, for example, varying the number of types of diodes (zener) used in place of D1 or by the use of a resistive divider chain. Furthermore, although visual indication by means of an LED are deemed preferable, the invention contemplates other types of indicators and there may be applications where an audible indication is required or desired.

Accordingly, while there has been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

This invention is useful in VIR-responsive television receivers having a manual tint preference control.

What is claimed is:

1. In a television receiver including circuitry for processing a VIR signal so that a VIR tint control voltage is automatically derived from the VIR signal, said receiver additionally including manually operated circuitry for providing a tint preference voltage for offsetting the VIR tint control voltage, an improvement including comparing means, said means comprising:
   a first amplifier having a first input coupled to the tint preference voltage and a second input coupled to the VIR tint control voltage,
   a second amplifier having a first input coupled to the VIR tint control voltage and a second input coupled to the tint preference control voltage, and
   means coupled between the second input of the first amplifier and the first input of the second amplifier for establishing the limits within which the comparing means will detect approximate equality between the VIR tint control and tint preference voltages and provide a signal at its output in response thereto.

2. An improvement as defined in claim 1 further including indicating means coupled to the output of the comparing means for providing a sensory indication of the approximate equality between the VIR tint control and tint preference voltages.

3. An improvement as defined in claim 2 wherein the indicating means includes an LED coupled to the outputs of the first and second amplifiers.

4. An improvement as defined in claim 3 wherein the means coupled between the second input of the first amplifier and the first input of the second amplifier is a diode so that the comparing means and indicating means detect and indicate a condition under which the VIR tint control and tint preference voltages are within one diode-drop of each other.

* * * * *